Figure 1:
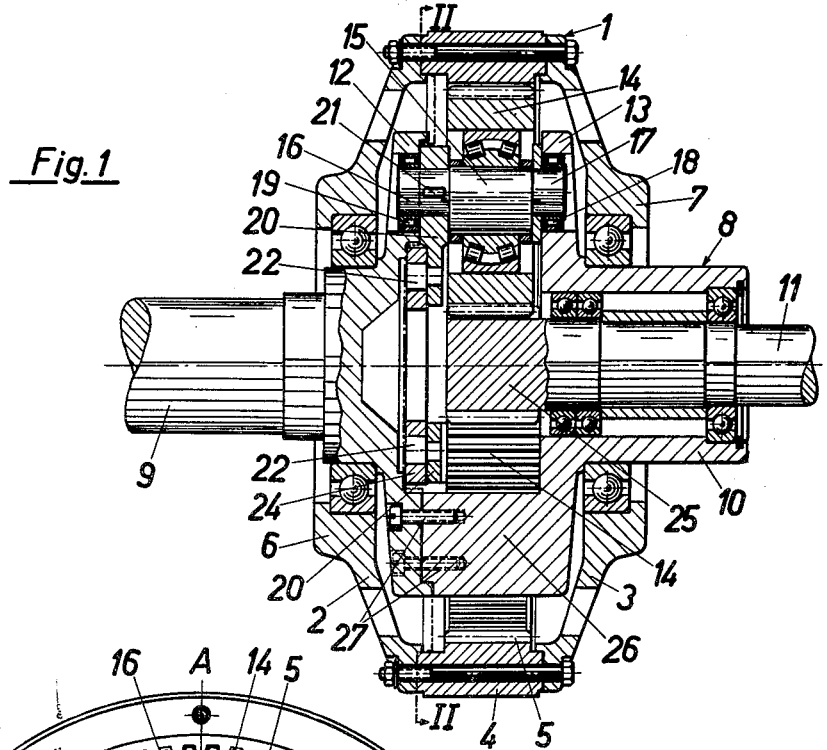

March 12, 1963  F. FRITSCH  3,080,775
EPICYCLIC GEAR
Filed Dec. 5, 1960

INVENTOR
FELIX FRITSCH
BY *Imirie & Smiley*
ATTORNEYS

United States Patent Office 3,080,775
Patented Mar. 12, 1963

3,080,775
EPICYCLIC GEAR
Felix Fritsch, Vienna, Austria, assignor to Simmering-Graz-Pauker Aktiengesellschaft fur Maschinen-, Kessel- und Waggonbau, Vienna, Austria
Filed Dec. 5, 1960, Ser. No. 73,649
Claims priority, application Austria Mar. 4, 1960
3 Claims. (Cl. 74—801)

This invention relates to epicyclic gears consisting of a sun wheel, a hollow wheel and planet wheels running on eccentric pins, which are rotatably mounted in the planet carrier.

Epicyclic gears are often provided with only one planet wheel. Since this is uneconomical in view of the low power which can be transmitted, it is desired to provide several planet wheels. This creates the problem of ensuring an even load distribution to all planet wheels.

Various designs are known to solve this problem, for instance, gears comprising two diametrically opposed planet wheels running on eccentric pins to which radially extending levers are secured, which have claws or toothed segments and which interengage so that a rotation of one eccentric pin results in an equal, but opposite rotation of the other. Whereas these gears constitute an improvement over those having only one planet wheel, they do not reach the power transmission ratings of gears having three planet wheels. It is known to provide three planet wheels spaced 120° apart and to arrange the sun and hollow wheels so that they have no bearings and centre themselves on the tooth flanks. This design is very complicated because the sun and hollow wheels must be connected by double-jointed couplings to the other parts of the transmission. Designs in which an adjustment of the sun wheel and the planet wheels (including individual and joint adjustments of the latter) is possible rather than an adjustment of the sun and hollow wheels are also known and have similar disadvantages.

It has also been proposed to mount several planet wheels on resilient intermediate sleeves, (e.g., of rubber) in order to ensure a uniform loading. This involves the disadvantage that the resilient material is under the action of oil and that the ultimate stress of such materials determines a power limit.

In precision-manufacture gears, several planet wheels are sometimes rigidly arranged and the natural deformation of the material is relied upon for an equalization of the load. In another known design of the type mentioned first hereinbefore, the object which is accomplished is only to eliminate flank backlash rather than an equalization of load.

The disadvantages of the known solutions are avoided by the design according to the invention.

It is a feature of the invention that the epicyclic gear comprises a sun wheel, a plurality of planet wheels grouped around and meshing with the sun wheel, a hollow wheel surrounding and meshing with the planet wheels, a planet wheel carrier, and eccentric pins freely rotatably mounted in said planet wheel carrier, the planet wheels freely rotatably mounted on said eccentric pins, each of said eccentric pins being connected to one end of a lever, the second end of the lever being operatively connected in a radial direction to a freely movable member.

Another feature of the invention resides in that the levers connected to the eccentric pins are connected to the freely movable member by power transmitting elements.

It is another feature of the invention that said power transmitting elements for connecting the levers to the freely movable member comprise pins.

Finally it is a feature of the invention that the freely movable member for connecting the levers consists of a disc.

Figure 2:
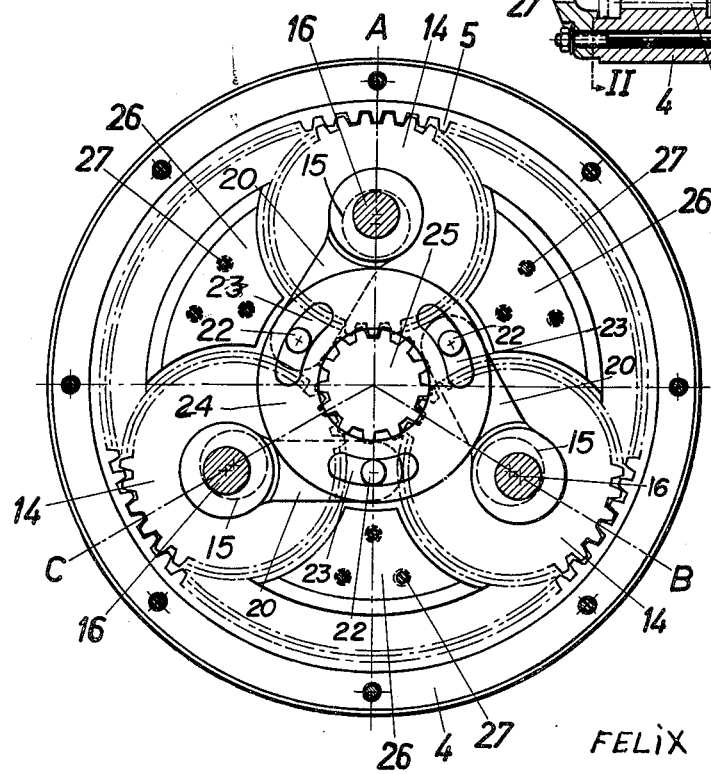

An illustrative embodiment of the invention is shown in the drawing. FIG. 1 is a longitudinal sectional view showing the epicyclic gear. FIG. 2 is a simplified transverse sectional view taken on line II—II of FIG. 1.

The epicyclic gear is accommodated in a housing 1, which consists of the two covers 2, 3 and the cylindrical intermediate part 4 rigidly connected thereto. This intermediate part 4 serves as a hollow wheel and is provided with an internal gear ring 5. A planet carrier 8 mounted in the hubs 6 and 7 of the covers 2 and 3 is connected at its output end to the output shaft 9 mounted in the hub 6 and has at its input end a hollow hub 10 mounted in the hub 7 and serving to receive the input shaft 11.

The planet carrier 8 has two spaced, opposed cheeks 12, 13, which are connected by lugs 26 and screws 27 and between which three planet wheels 14 are disposed, which are mounted in bearings spaced 120° apart and which mesh with the gear ring 5 of the hollow wheel 4 and with the sun wheel 25, which is disposed at the center of the gear and connected to the drive shaft 11.

Each of the epicyclic wheels 14 is carried by an eccentric pin 15, the eccentric end portions 16 and 17 are mounted in needle bearings 18 and 19 carried by the cheeks 12 and 13. Each of the end portions 16 has pushed thereon an eye bearing formed by one end of a lever 20 and coupled to the end portion 16 for rotation, e.g., by means of a key 21. The other end of the levers 20 is operatively connected in a radial direction directly or by suitable power transmitting elements to a member which is freely movable in its plane. In the present case the end of each lever 20 is connected to a pin 22. These pins 22 are operatively connected in a radial direction to a disc 24. The pins may be replaced by rollers, slide blocks or the like elements.

The power transmitting elements between the lever 20 and the movable disc 24 engage the latter at points spaced apart by equal angles, which in the illustrative embodiments described amount to 120°. The disc 24 has concentric cylindrical surfaces or plane surfaces parallel to the axis for transmitting power. In the present case the disc has concentric circular slots 23, which are spaced apart by equal angles and concentric with respect to the centre of the disc. These slots are engaged by the pins 22 secured to the ends of the levers 20. When the disc 24 is in its central position, the axis of each planet wheel 14, the axis of the pin 15 carrying the same, the axis of its eccentrically mounted end portions 16, 17 and the axis of the sun wheel 25 and of the gear as a whole lie in the same plane. This determines the length of the levers 20. Those planes of said axes which belong to the planet wheels 14 are indicated with dash and dot lines in FIG. 2 and designated A, B and C.

The levers 20 are so arranged relative to the eccentric pins 15 that the pins 22 secured to the ends of the levers act radially on the walls of the slots 23.

The disc 24 is freely movable in its plane and is only suspended from the three pins 22. As it is balanced only by the three forces radially transmitted by the levers 20 in directions spaced 120° apart, these three forces must be approximately equal in magnitude. Since the lengths of the levers and the eccentricities of the pins 22 are also equal to each other, the loads on the shafts of the three planet wheels must also be equal in magnitude. This affords a solution to the problem how to achieve a uniform load distribution on all planet wheels.

The described gear operates as follows: The rotation coming from the input shaft 11 is transmitted to the planet wheels 14 by the sun wheel 25. The planet wheels 14 mesh with and revolve along the gear ring 5 of the stationary housing 1 and transmit their rotation by means of the eccentric pins 15 and their end portions 16, 17 to the planet carrier 8, which drives the output shaft 9. It is obvious that motion can also be transmitted in the other sense, from shaft 9 to shaft 11.

If manufacturing inaccuracies result in differences between the angles between the bearings for the eccentric pins or between the points where the pins engage the lever ends in the slots of the disc, this will necessarily result in differences in the distribution of the load to the three planet wheels. However, these differences are so small that they are practically insignificant.

Whereas three planet wheels are provided in the illustrative embodiment shown, the design according to the invention can also be applied to arrangements comprising two planet wheels which are spaced 180° apart. With two planet wheels it is no longer necessary to provide elongated holes in the disc 24, but the lever 20 and the disc 24 may be connected by a single joint comprising a pin in a simple bore.

Other modifications in design are also possible within the scope of the invention, e.g., the needle bearings 18 may be replaced by other bearings. Further, the disc 24 may be replaced by a ring or another element which receives the pins 22. Finally, the housing 1 may be designed to be rotatable in one direction or the other.

What is claimed is:

1. An epicyclic gear, comprising a sun wheel, a plurality of planet wheels grouped around and meshing with said sun wheel, a hollow wheel surrounding and meshing with the planet wheels, a planet wheel carrier, eccentric pins freely rotatably mounted in said planet wheel carrier, the planet wheels being freely rotatably mounted on said eccentric pins, each of said eccentric pins being connected to one end of a lever, and means for operatively coupling the free ends of the levers, said means including a disc which extends transversely to the axis of the gear and which is freely movable in its plane, a pin parallel to the gear axis and secured to the free end of each lever, and cylindrical surfaces concentric with the axis of the gear on said disc and in engagement with the said pins whereby the connections between the disc and the end of the levers are effective only in directions radial to the gear.

2. An epicyclic gear, comprising a sun wheel, a plurality of planet wheels grouped around and meshing with said sun wheel, a hollow wheel surrounding and meshing with the planet wheels, a planet wheel carrier, eccentric pins freely rotatably mounted in said planet wheel carrier, the planet wheels being freely rotatably mounted on said eccentric pins, each of said eccentric pins being connected to one end of a lever, and means for operatively coupling the free ends of the levers, said means including a disc which extends transversely to the axis of the gear and which is freely movable in its plane, a pin parallel to the gear axis and secured to the free end of each lever, and slots on said disc receiving the said pins whereby the connections between the disc and the ends of the levers are effective only in directions radial to the gear.

3. An epicyclic gear, comprising a sun wheel a plurality of planet wheels grouped around and meshing with said sun wheel, a hollow wheel surrounding and meshing with the planet wheels, a planet wheel carrier, eccentric pins freely rotatably mounted in said planet wheel carrier, the planet wheels being freely rotatably mounted on said eccentric pins, each of said eccentric pins being connected to one end of a lever, and means for operatively coupling the free ends of the levers, said means including a disc which extends transversely to the axis of the gear and which is freely movable in its plane, a pin parallel to the gear axis and secured to the free end of each lever, and equally spaced slots concentric with the axis of the gear on said disc and receiving the said pins whereby the connection between the disc and the free end of each lever is effective to move the disc only in a direction radial to the gear.

References Cited in the file of this patent

UNITED STATES PATENTS

| | | |
|---|---|---|
| 2,027,592 | Hoffman et al. | Jan. 14, 1936 |
| 2,444,734 | Gillett | July 6, 1948 |
| 2,501,034 | Derbyshire | Mar. 21, 1950 |

FOREIGN PATENTS

| | | |
|---|---|---|
| 701,492 | France | Jan. 12, 1934 |